(12) United States Patent
Rousseau

(10) Patent No.: US 9,744,699 B2
(45) Date of Patent: Aug. 29, 2017

(54) METHODS FOR INCREASING IMPACT RESISTANCE OF REINFORCED POLYMERIC COMPOSITES

(71) Applicant: GM Global Technology Operations LLC, Detroit, MI (US)

(72) Inventor: Ingrid A. Rousseau, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 469 days.

(21) Appl. No.: 14/471,829

(22) Filed: Aug. 28, 2014

(65) Prior Publication Data

US 2016/0059451 A1 Mar. 3, 2016

(51) Int. Cl.

| B29C 43/20 | (2006.01) |
|---|---|
| B29C 44/10 | (2006.01) |
| B29C 44/12 | (2006.01) |
| B29K 105/00 | (2006.01) |
| B29K 307/04 | (2006.01) |
| B29C 43/18 | (2006.01) |
| B29C 43/52 | (2006.01) |
| B29L 31/30 | (2006.01) |

(52) U.S. Cl.
CPC ............ *B29C 43/203* (2013.01); *B29C 44/10* (2013.01); *B29C 44/1228* (2013.01); *B29C 43/18* (2013.01); *B29C 43/206* (2013.01); *B29C 43/52* (2013.01); *B29K 2105/253* (2013.01); *B29K 2307/04* (2013.01); *B29L 2031/3005* (2013.01)

(58) Field of Classification Search
CPC . B29C 44/1219; B29C 44/328; B29C 43/203; B29C 44/1228
See application file for complete search history.

(56) References Cited

U.S. PATENT DOCUMENTS

| 2,866,730 A | * | 12/1958 | Potchen | ................. B29C 44/22 |
|---|---|---|---|---|
| | | | | 156/273.5 |
| 5,024,818 A | | 6/1991 | Tibbetts et al. | |
| 5,374,415 A | | 12/1994 | Alig et al. | |
| 7,846,366 B2 | | 12/2010 | Iobst et al. | |
| 8,309,644 B1 | | 11/2012 | Huang | |
| 8,486,321 B2 | | 7/2013 | Kia | |
| 8,641,957 B2 | | 2/2014 | Atkins et al. | |
| 8,840,827 B2 | | 9/2014 | Iobst et al. | |
| 2004/0071935 A1 | | 4/2004 | Kia et al. | |
| 2006/0057335 A1 | | 3/2006 | Wang et al. | |
| 2012/0213997 A1 | | 8/2012 | Wang et al. | |
| 2012/0235442 A1 | | 9/2012 | Ezzat et al. | |
| 2013/0009332 A1 | * | 1/2013 | Goedecke | ............... B29C 33/68 |
| | | | | 264/46.5 |
| 2013/0108824 A1 | | 5/2013 | Berger et al. | |

\* cited by examiner

*Primary Examiner* — Stella Yi

(57) ABSTRACT

Methods of compression molding polymeric parts for improved impact resistance are provided. The components are particularly suitable for use in a vehicle or an automobile. The compression molded polymeric component comprises a central region or core comprising integrally formed foam, e.g., a foam core, that can sustain high impact load and does not lead to visible surface cracking or material cracking. The polymeric component may be a reinforced plastic composite (FRP). Such methods can produce lightweight, impact resistant, FRP components that may be used in various structural applications, including in automobiles.

19 Claims, 3 Drawing Sheets

METHODS FOR INCREASING IMPACT RESISTANCE OF REINFORCED POLYMERIC COMPOSITES

FIELD

The present disclosure relates to methods for increasing impact resistance of compression molded polymeric components, especially of fiber-reinforced thermoplastic resin composites.

BACKGROUND

This section provides background information related to the present disclosure which is not necessarily prior art.

Light-weight polymeric components, such as reinforced composite materials, have been considered for use as structural and load-carrying components in vehicles. Many of such polymeric materials are manufactured by compression molding. However, conventional polymeric composite materials, including those that are compression molded, have not exhibited the necessary robustness for extensive long-term use as structural or load-carrying vehicle components. Such polymeric composite materials tend to have limited ductility (e.g., increased brittleness) as compared to other conventional materials, like metals, and therefore polymeric composites exhibit lower impact resistance. Improved composite materials having increased impact resistance and toughness for vehicle, construction, aeronautics, and other applications would be highly desirable to improve long-term durability of such structures for both load-bearing and non-load bearing applications, while reducing weight, reducing fuel consumption for transportation, facilitating handling, and increasing design and flexibility, among others.

SUMMARY

This section provides a general summary of the disclosure, and is not a comprehensive disclosure of its full scope or all of its features.

The present disclosure pertains to methods of compression molding polymeric components. In one aspect, a method of compression molding a polymeric component having improved impact resistance is provided that comprises applying a foaming agent to a first surface of a first polymeric material to be compression molded (e.g., a first blank of polymeric material). A second surface of a second polymeric material to be compression molded (e.g., a second blank comprising a polymeric material) is then contacted with the foaming agent previously applied to the first surface to form an assembly. The assembly thus includes the foaming agent sandwiched between the first blank and the second blank. The assembly is then disposed in a mold cavity of a compression mold. In certain variations, the compression mold and mold cavity is optionally pre-heated. Finally, the assembly is compression molded (in the compression mold) by applying heat and pressure to form a compression molded consolidated polymeric component comprising a first polymeric layer, an intermediate foam layer, and a second polymeric layer.

In certain aspects, the first polymeric material and the second polymeric material may comprise a thermoset polymer. In other aspects, the first polymeric material and the second polymeric material may comprise a thermoplastic polymer. As appreciated by those having ordinary skill in the art, the compression molding methods steps and conditions may vary depending on whether the first and second polymeric materials comprise a thermoset polymer or a thermoplastic polymer.

In certain aspects, a method of compression molding a polymeric component having improved impact resistance is contemplated, where the method comprises applying a foaming agent to a first surface of a first preheated blank comprising a first polymeric material. Then, a second surface of a second preheated blank comprising a second polymeric material is contacted with the foaming agent to form an assembly. In such variations, the first polymeric material and the second polymeric material may comprise at least one thermoplastic polymer. The foaming agent is sandwiched between the first preheated blank and the second preheated blank in the assembly. The assembly is disposed in a mold cavity of a compression mold. In certain variations, the compression mold and mold cavity is optionally pre-heated. The assembly is then compression molded by applying or maintaining heat and applying pressure to form a compression molded consolidated polymeric component comprising a first polymeric layer, an intermediate foam layer, and a second polymeric layer. In certain aspects, the assembly remains in the compression mold until the mold is cooled to a predetermined temperature.

In yet another aspect, a method of compression molding a polymeric structural component having improved impact resistance is contemplated. The method comprises applying a foaming agent to a first surface of a first blank comprising a first composite material. A second surface of a second blank comprising a second composite material is contacted with the foaming agent to form an assembly. The foaming agent is sandwiched between the first blank and the second blank in the assembly. The assembly is disposed in a mold cavity, which is optionally preheated, of a compression mold. The assembly is then compression molded by applying or heat and applying pressure to form a compression molded consolidated polymeric structural component comprising a first composite layer, an intermediate foam layer, and a second composite layer. In certain aspects, the compression molded consolidated polymeric structural component thus formed may be a structural component for a vehicle and thus may be selected from the group consisting of: a hood, an underbody shield, a structural panel, an interior floor, a floor pan, a roof, an exterior surface, a fender, a scoop, a spoiler, a storage area, a glove box, a console box, a gas tank protection shield, a trunk, a trunk floor, a truck bed, and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
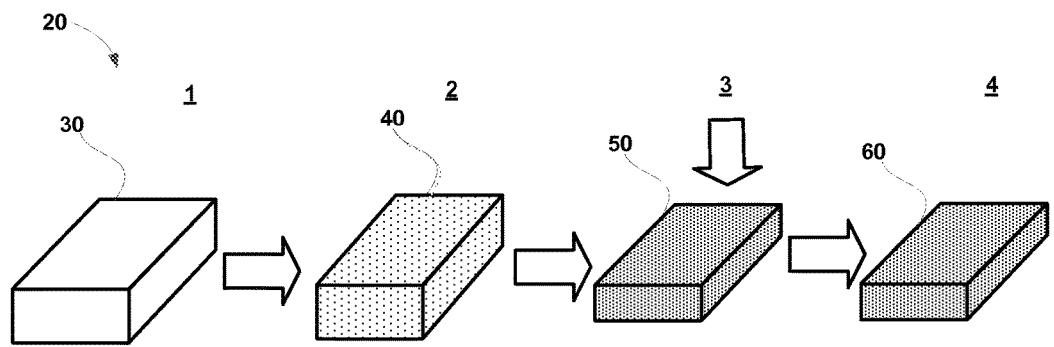
FIG. 1A shows a schematic of a compression molding blank made of a polymeric material comprising a thermoplastic polymer processed via a conventional compression molding process to form a consolidated component.

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

In various aspects, the present disclosure pertains to methods of compression molding polymeric parts for improved impact resistance. Compression molding is usually used to make large flat components to moderately curved or otherwise shaped components. Compression molding is often used to form polymeric automotive parts, such as structural or load-carrying parts.

The present disclosure provides improved impact resistant components formed by compression molding for both load-carrying and non-load carrying applications. In certain aspects, the components are particularly suitable for use in a vehicle or automobile. However, in certain alternative variations, the impact resistant component provided by the present disclosure may be a structural component for other applications, such as aeronautics, construction, and the like, by way of non-limiting example. While exemplary flat or planar components are illustrated and described throughout the present disclosure, it is understood that the concepts in the present disclosure may be applied to any impact resistant structural component. Non-limiting impact resistant structural components used in vehicles or other automotive applications include, but are not limited to, hoods, underbody shields, structural panels, interior floors, floor pans (e.g., of a cargo van), roofs, exterior surfaces, fenders, scoops, spoilers, storage areas, including glove boxes, console boxes, gas tank protection shields, trunks, trunk floors, truck beds, and the like. Specifically, the present disclosure is particularly suitable for any piece of hardware subject to impact loading (e.g., load applied at elevated strain rates) where load may vary from low to high values. In alternative variations, the present disclosure is likewise applicable to any piece of hardware subject to non-load bearing applications and to static or quasi-static load-bearing applications.

The impact resistant component comprises a polymeric material. In certain variations, the polymeric material is optionally a composite material. The polymeric material may be formed from or comprise a thermoplastic resin or a thermoset resin. The composite may further exhibit viscoelastic properties. In certain aspects, a suitable composite may include a plurality of reinforcement materials and thus may be a reinforced composite. Reinforcement materials may be in the form of particulates, whiskers, short fibers, long fibers, continuous fibers, fabrics, and the like, or any combination thereof.

In certain aspects, the present disclosure contemplates an impact resistant component (e.g., for an automobile or vehicle) that is consolidated and includes a central region or core comprising an integrally formed foam that is disposed or sandwiched between two layers of consolidated polymeric material. The consolidation may occur through compression molding. A vehicle component formed of a polymeric composite material is lighter in weight, as compared to metal components, and thus provides better fuel economy for a vehicle. A representative weight reduction of a vehicle component formed of a composite material in certain variations of the present teachings is greater than or equal to about 40%, optionally greater than or equal to about 50%, and optionally greater than or equal to about 60% by weight as compared to a metal structure having the same performance and a similar design. It shall be noted that although to achieve identical performance, a composite part will generally have a greater thickness than its equivalent metal part, however, because of the intrinsic density difference between composite materials and metals the weight reduction advantages are conserved.

Figure 1B:
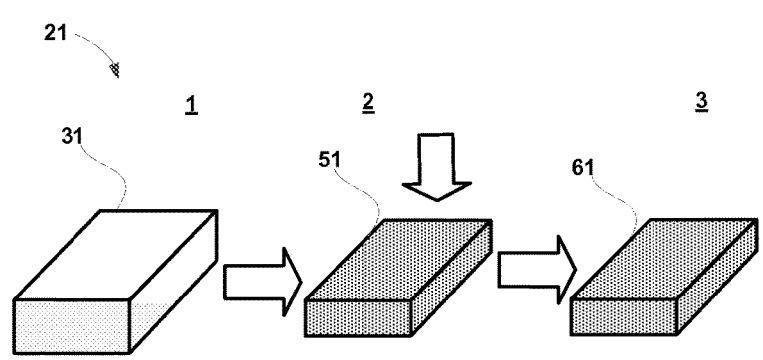
FIG. 1B shows a schematic of a compression molding blank made of a polymeric material comprising a thermoset polymer processed via a conventional compression molding process to form a consolidated component.

By way of background, FIGS. 1A and 1B show schematics of a compression molding blank made of a polymeric material that is processed via a conventional compression molding process to form a consolidated component. A "blank" as used herein means a preform structure for a compression molding process that comprises a polymeric material. While the blank may be any shape, in certain preferred aspects, the blank is a flat panel or other planar structure that is well suited to a compression molding process. The blank comprises a polymeric material (which may include a polymeric precursor that forms a polymer via crosslinking after being subjected to the heat and pressure of the compression molding process, or which may include polymer particles or binder that form a uniform polymer matrix after being subjected to the heat and pressure of the compression molding process). In certain aspects, the blank comprises either a thermoset polymer or a thermoplastic polymer. As appreciated by those having ordinary skill in the art, the compression molding methods steps and conditions can vary depending on whether the polymeric material comprises a thermoset or a thermoplastic polymer. FIG. 1A shows an exemplary compression molding process where the polymeric material comprises a thermoplastic polymer. FIG. 1B shows an exemplary compression molding process where the polymeric material comprises a thermoset polymer. As will be discussed in more detail below, the blank may be a composite material. The blank may be preformed of a composite material comprising a polymer, polymer precursor, or resin and the reinforcement material before initiating any aspect of the compression molding process.

As shown in a formation process 20 of FIG. 1A, a blank 30 comprising a polymeric material is provided at room temperature ($T_1$) and atmospheric pressure ($P_1$) in step 1. The polymeric material comprises a thermoplastic polymer. The blank 30 is flat and thus has a planar rectangular shape, but may have other shapes, as discussed above. The blank 30 is heated to form a heated blank 40 in step 2. More specifically, the blank 30 is maintained at atmospheric pressure ($P_1$) while being heated to $T_2$ ($>T_1$) in step 2 to form heated blank 40. The heating in step 2 occurs prior to introduction in a cavity of a compression mold, in a separate heating unit, and thus may be considered to be "preheating." The amount of heating or pre-heating depends on certain properties of the thermoplastic materials forming the blank 30, such as a glass transition temperature ($T_g$) and a melting temperature ($T_m$) of the thermoplastic resins. In addition, the method of heating or pre-heating may also depend on manufacturing consideration such as cycle time, energy cost, capital cost, space requirements, and the like. In certain aspects, the preheating occurs to bring the heated blank 40 to a temperature (T) that is near the $T_m$ of the material, for example, greater than or equal to the $T_m$. In other aspects, the "direct" heating in the press occurs to the blank 30 to a temperature (T) that is greater than the $T_m$ of the material, for example $T>T_m$ After the heating step, the preheated or heated blank 40 is positioned in a heated mold cavity (not shown) of a compression mold in step 3 of method 20. In step 3, heat ($T_3$) and pressure ($P_3$) are applied to the blank 50 during compression molding to force the polymeric material to melt (thermoplastic) and simultaneously conform to the mold/mold cavity and thus form a high density consolidated product 50. Notably, applying of heat to temperature ($T_3$) includes maintaining heat in the embodiments where the blank 40 is preheated/heated prior to introduction into the compression mold. The consolidation to form high-density consolidated product 50 via compression molding may occur at high temperatures and high pressures. In certain aspects, the consolidation via compression may occur while compression molding at a compression molding temperature (T) that is between the $T_g$ and the $T_m$ of the material and at relatively high pressures (e.g., less than or equal to about 15 MPa).

In certain aspects, the consolidated compression molded blank 60 may remain in the compression mold at step 4 until the mold is cooled to a predetermined temperature (for example, a temperature below either a crystallization temperature and/or glass transition temperature of the polymer to permit the compression molded thermoplastic component to have the desired crystallinity and/or other properties). It should be noted that the final consolidated product 60 may have other shapes than that shown (corresponding to the shape of the compression mold cavity) and the rectangular panels shown throughout the figures are merely exemplary and non-limiting. It should also be noted that the final consolidated product 60 may have a shape that differs from the shape of blank 30. As shown in FIG. 1A and is typical for conventional compression molding processes, the final consolidated product 60 formed by compression molding has only a single layer.

As shown in a formation process 21 of FIG. 1B, a blank 31 comprising a polymeric material is provided at room temperature ($T_1$) and atmospheric pressure ($P_1$) in step 1. The polymeric material comprises a thermoset polymer. The blank 31 is flat and thus has a planar rectangular shape, but may have other shapes, as discussed above. In the compression molding formation process 21, the blank 31 may be heated after introducing the blank 31 directly into a compression mold ($T_3$) (not shown). Because the thermoset materials in the blank are either uncured or partially cured, the preheating step is not required as the material is compliant and easily conformable to the mold cavity, moreover, a preheating step may in fact be undesirable as it could cause premature reaction and solidification of the thermoset composite. The compression mold may be preheated prior to placing the blank 31 therein. The amount of heating depends on certain properties of the thermoset polymers, such as a curing temperature ($T_c$) of the thermoset resins. In addition, the method of heating or pre-heating may also depend on manufacturing consideration such as cycle time, energy cost, capital cost, space requirements, and the like. Thus, the direct heating in the mold in step 2 brings the blank 51 to a temperature (T) that is near the curing temperature of the material, for example equal to $T_c-10°$ C.$\leq T \leq T_c+10°$ C.

The blank 51 is thus positioned in a heated mold cavity (not shown) of a compression mold in step 2 of method 21. In step 2, heat ($T_3$) and pressure ($P_3$) are then applied to the blank 51 during compression molding to react or cure the thermoset, while also concurrently forcing the material to conform to the mold/mold cavity and thus form a high density consolidated product 61. The consolidation to form high-density consolidated product 61 via compression molding may occur at high temperatures and high pressures. In certain aspects, the consolidation via compression may occur while compression molding at a compression molding temperature (T) that is near the curing temperature ($T_c$) of the polymeric material and at high pressures (e.g., less than or equal to about 15 MPa).

In certain aspects, the compression molded cured or crosslinked consolidated product 61 may be removed from the mold at step 3. It should be noted that the final consolidated product 61 may have other shapes than that shown (corresponding to the shape of the compression mold cavity) and the rectangular panels shown throughout the figures are merely exemplary and non-limiting. It should also be noted that the final consolidated product 61 may have a shape that differs from the shape of blank 31. As shown in FIG. 1B and is typical for conventional compression molding processes, the final consolidated product 61 formed by compression molding has only a single layer.

In accordance with certain aspects of the present disclosure, new processes are contemplated that create an improved compression molded polymeric component having improved impact resistance. The compression molded polymeric component comprises a central region or core comprising integrally formed foam, e.g., a foam core fiber-reinforced plastic composite (FRP), that can sustain high impact load and does not lead to visible surface cracking or material cracking when subject to typical impact loads and stresses. Therefore, such a process can produce FRP components that may be used in various structural applications, such as in automotive, aeronautic, construction and the like, overcoming or addressing many of the potential impediments to using such materials in such applications.

Figure 2:
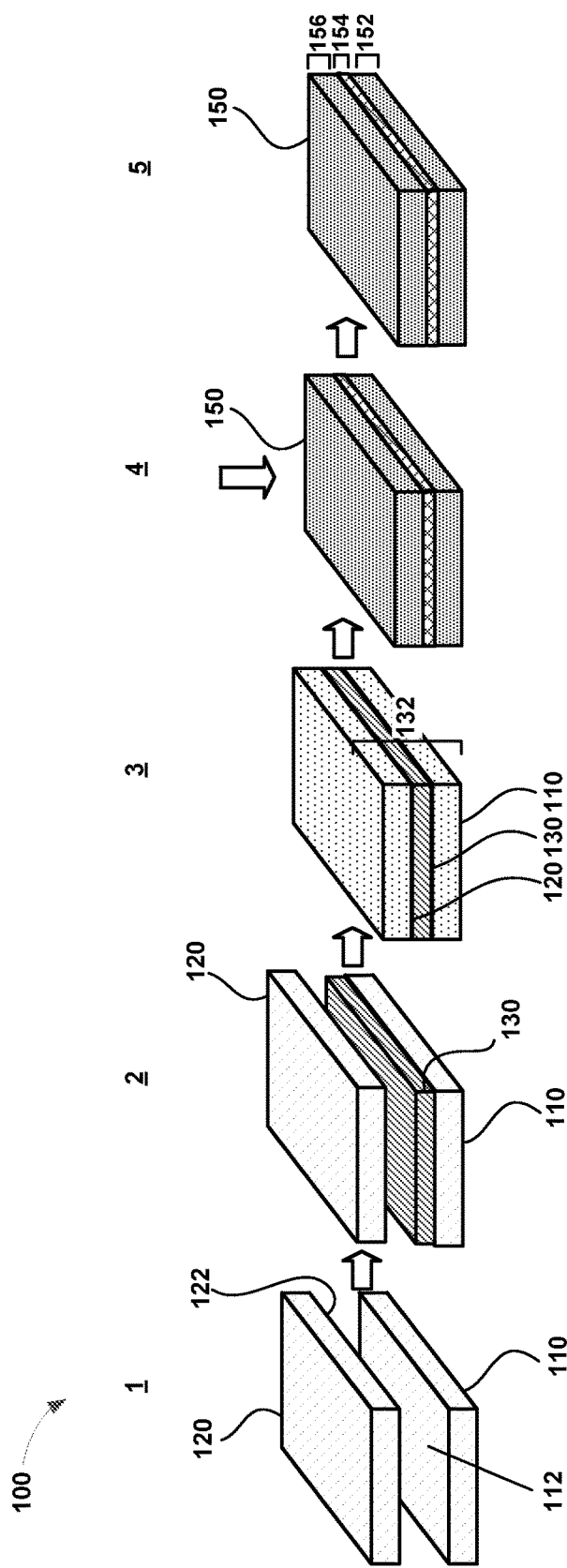
FIG. 2 shows a schematic of two compression molding blanks made of polymeric material with a foaming agent introduced therebetween that form a consolidated component via a compression molding process according to certain aspects of the present disclosure.

For example, in one aspect, a method of compression molding a polymeric component having improved impact resistance is provided as shown in FIG. 2. Such a method 100 may include a first step 1 of providing a first blank 110 comprising a polymeric material and a second blank 120 comprising a polymeric material. While two blanks are shown, it should be noted that additional blanks might also be used, depending on the ultimate use and properties required for the consolidated product. Additionally, while the first blank 100 and the second blank 120 are shown to have the same shape and dimensions, some amount of variation in shape or dimensions including thickness may be permitted or desired, so long as the blanks maybe processed and consolidated together in a compression mold. For example, a final product where improved impact resistance may only be required over a localized or select area of the overall compression molded product. Thus, in certain variations, only select regions of the consolidated product are processed with both a first blank and a second blank employed for having the sandwiched foam core, while regions outside the select area may have only the first blank (and no foaming agent applied). This can provide impact resistance at the desired select locations or regions on the final molded product, thereby optimizing final part performance, weight reduction and raw material cost. In such processes, the compression tool (upper and lower cavities) would have to be made to account for such product construction, by having certain regions that accepts two blanks, while other regions would only have a single molded compression blank.

As discussed further below, in certain aspects, it is desirable that first blank 110 and second blank 120 comprise at least one polymer (e.g., a polymer, a resin, or a polymer precursor) that facilitates in situ formation and entrapment of a foam core by use of a foaming agent. Although the polymeric material of the first blank 110 and the second blank 120 may be independently selected from one another, they should be compatible to allow adequate cohesion during the compression process and avoid delamination of the final consolidated product 150 at the foam core region 154 between the consolidated blank 156 and 152. In certain variations, a suitable thickness for each respective first blank 110 and second blank 120 may be greater than or equal to about 1 mm to less than or equal to about 3 mm. While not limiting, a suitable blank may have at least one dimension (e.g., width or length) of greater than or equal to about 200 mm to less than or equal to about 1500 mm. In one example, a suitable blank has a dimension of about 535 mm by about 535 mm.

A polymeric material includes polymers and precursors of polymers, such as resins, monomers, oligomers, and the like. Thus, the blank may comprise a resin or precursor, such as monomers or oligomers, which will react, cure, and/or cross-link to form a polymer after a compression molding process. In certain variations, the polymer (or precursor thereof) may be a thermoplastic polymer, capable of softening when a process temperature (T) is greater than $T_g$ and capable of flowing when T approaches or exceeds $T_m$, thereby deforming when pressure is applied during a molding process, and forcing the polymer to conform to the mold shape. In other variations, the polymer (or precursor thereof) may be a partially cured thermoset polymer, capable of deforming to a mold shape at low temperature (e.g., room temperature) when submitted to a compressive force as would be the case in a molding process. Further increasing the temperature (T) to near the curing temperature $T_c$ of the polymer would cause the polymer to react/crosslink thereby permanently adopting the shape of the compression mold.

A polymeric material includes polymers and precursors of polymers, such as resins, monomers, oligomers, and the like.

Thus, in certain aspects, the blank may comprise resin or precursor, such as monomers or oligomers, which will react, cure, and/or cross-link to form a polymer after a compression molding process. In certain variations, the polymer or precursor thereof may be a thermoset polymer (uncured or partially cured), which is a soft material or a viscous liquid at low temperatures and will be capable of conforming to a mold shape during a compression molding process and further capable of curing or cross-linking in that compressed shape when T approaches the curing temperature ($T_c$).

In certain aspects, a thermoplastic polymer may be formed from any suitable kind of thermoplastic resin. By way of non-limiting example, the thermoplastic polymer may include: vinyl chloride resin, vinylidene chloride resin, vinyl acetate resin, polyvinyl alcohol resin, polystyrene resin, acrylonitrile styrene resin, acrylonitrile-butadiene-styrene resin, acrylic resin, methacrylate resin, polyethylene resin, polypropylene resin, polyamide resin (PA6, PA11, PA12, PA46, PA66, PA610), polyacetal resin, polycarbonate resin, polyethylene terephthalate resin, polyethylene naphthalate resin, polybutylene terephthalate resin, polyacrylate resin, polyphenylene ether resin, polyphenylene sulfide resin, polysulfone resin, polyether sulfone resin, polyether ether ketone resin, polylactide resin, or any combination or copolymer of these resins.

In certain aspects, a thermoset polymer or precursors thereof may be formed from any kind of thermoset resin and precursors thereof. By way of non-limiting example, the thermoset polymer precursors may include: epoxy monomers of varying end-functionalities (e.g., ester, amines, dianhydride), or polyester polymers, derivatives, and combinations, thereof.

In certain aspects, the polymeric material forming the blank may be a polymeric composite material that comprises a polymer matrix and a reinforcement material distributed therein, such as a plurality of reinforcing particles or fibers. As discussed above, such a reinforcement material may be added to the polymeric material in advance of compression molding. In certain aspects, a polymeric composite may include a reinforcement material comprising a plurality of fibers, whiskers, platelets, or particles. Suitable examples of reinforcement materials include carbon fibers, glass fibers, carbon black particles, (nano-) clay platelets, and combinations thereof, by way of non-limiting example. In the case of a reinforced thermoset polymer material, the blanks may be formed of typical sheet molding compounds (SMC) or compression molding pre-preg composite material, well known to those of skill in the art.

Thus, in certain variations, suitable polymeric materials are fiber-reinforced composite materials comprising a thermoplastic or thermoset polymer reinforced and a reinforcement material, such as a carbon fiber material. Suitable fibers may include relatively short length fibers (having lengths of ≥about 0.1 mm to ≤about 10 mm), relatively long length fibers (having lengths of ≥about 10 mm to ≤about 100 mm), or continuous fibers (having lengths of ≥about 100 mm), and may include any combinations thereof. Long length fibers can provide to a composite material a good balance of moldability and productivity over continuous fibers while exhibiting greater performance than composites comprising their short fiber homologs that may be easier molded.

The fibers (e.g., carbon fibers) may be provided as fiber mats having interconnecting or contacting fibers or may be randomly distributed individual fibers within the resin matrix. In certain variations, a fiber mat comprising carbon fibers may be used with highly planar oriented or uni-directional oriented fibers or a combination thereof. The fiber mat may have a random-oriented fiber. In other variations, a random carbon fiber mat can be used as a preform of a fiber-reinforced composite material that is shaped. The random mat may include reinforcing carbon fibers having an average fiber length of greater than or equal to about 3 mm to less than or equal to about 100 mm and a thermoplastic resin. In addition, a uni-directional oriented carbon fiber layer may be included in order to enhance local stiffness and strength.

The fibers or other reinforcements within the composite may be configured in a random-oriented manner, for example, in a substantially two-dimensionally-random oriented or in a specific-direction-oriented manner. In certain variations, suitable fiber-reinforced composite materials may comprise a thermoplastic polymer comprising a reinforcement material distributed with a substantially three-dimensionally random orientation.

In certain variations, the composite may comprise a reinforcement material that is surface-modified or grafted with a polymer. The polymeric composite material may include a fiber-reinforced layer and a resin layer laminated together, which may require incorporation of several distinct blanks. Such fiber-reinforced composite materials may be manufactured from a compression molding process.

As appreciated by those of skill in the art, the reinforced composite material may further include other conventional ingredients, including other reinforcement materials, functional fillers or additive agents, like organic/inorganic fillers, fire-retardants, anti-ultraviolet radiation agents (UV stabilizers), anti-oxidants, colorants, mold release agents, softeners, plasticizing agents, surface active agents, and the like.

While thermoplastic resins tend to have relatively high elongation values, such materials by themselves often do not exhibit sufficient strength. Reinforced composite materials having reinforcement materials, such as glass fiber reinforced polymeric composites (GFRP) or carbon fiber reinforced polymeric composites (CFRP), exhibit high strength and adequate levels of stiffness, while also being lightweight (as compared to metals). However, reinforced composite materials typically have low levels of elongation. Small or low elongation levels in a polymeric composite component create local cracks or failure under concentrated impact load (hence, impact resistance of the component is insufficient). Thus, in accordance with various aspects of the present disclosure, a reinforced composite component has increased impact resistance due to a modified design having a central layer or core region comprising an intermediate foam layer that acts as a damping layer under load. The improved reinforced composite component according to certain aspects of the present disclosure exhibits increased toughness, while avoiding changing its chemical formulation or intrinsic properties, including retaining strength.

With renewed reference to FIG. 2, the method 100 includes step 2 of contacting a foaming agent 130 to a first surface 112 of first blank 110. The foaming agent 130 may be applied over substantially all of the first surface 112 (e.g., covering the surface) or may be applied to select regions of first surface 112. Notably, FIG. 2 shows the foaming agent 130 being applied only to first surface 112 of first blank 110; however, while not shown, foaming agent 130 may alternatively be applied to a second surface 122 of second blank 120 or to both the first surface 112 and the second surface 122, depending on the thickness of a foam layer that is desired. A greater amount of applied foaming agent 130 will result in a greater thickness of a central foam layer. The foaming agent 130 may be applied to the first blank 110 and the second blank 120 at ambient temperature and pressure conditions.

In certain variations, the foaming agent 130 may be applied to the first surface 112 by spraying, spreading, or otherwise distributing or laminating. The foaming agent 130 may be in a pellet form embedded within a polymer matrix that may be selected based on its compatibility with blank 110 and 120. In certain aspects, the foaming agent may be in a powdered form. In yet another variation, the foaming agent may be delivered pre-bound to a thin mat, net, or other material, which may be made of a polymer compatible with that of blank 110 and 120, at an amount required for the specific foaming requirement for a given product. One or more distinct foaming agents 130 may be applied to the surfaces of the blanks (e.g., first surface 112 of first blank 110 or second surface 122 of second blank 120).

Foaming agents have conventionally been used in injection molding and extrusion processes, but it is not believed that chemical foaming agents have been previously employed with compression molding processes. Injection molding and extrusion have relatively low pressures and temperatures as compared to compression molding. Suitable chemical foaming agent(s) 130 and polymer matrix in which they may be embedded are selected in accordance with the present disclosure for compatibility with both the polymer(s) used in the blanks (so that the foaming agent will foam and its polymer matrix will react or melt and blend with first blank 100 and second blank 120), as well as for an ability to withstand the process conditions (e.g., temperature and pressure) associated with compression molding of the polymer(s). Chemical foaming agents have an initial activation temperature $(T_A^i)$ above which decomposition, gas generation, and thus foaming begin. Chemical foaming agents have an optimal gas yield temperature $(T_A^{max})$ above which decomposition, gas generation, and thus foaming is maximum. Chemical foaming agents selected for the processes in accordance with the present disclosure activate at relatively high temperatures and can sustain high pressures attendant with compression molding.

In certain aspects, the optimum gas yield temperature $(T_A^{max})$ is selected to be near the melting temperature $(T_m)$ of the polymer, when the polymer is a thermoplastic. In certain aspects, $T_A^{max}$ is less than $T_m$. For example, $T_A^{max}$ may be within 5° C. of $T_m$ (e.g., $T_m = T_A^{max} + 5°$ C.), optionally $T_A^{max}$ may be equal to about 10° C. or less than $T_m$, optionally $T_A^{max}$ be equal to about 20° C. or less than $T_m$, optionally $T_A^{max}$ may be about 30° C. or less than $T_m$, optionally $T_A^{max}$ may be about 40° C. or less than $T_m$, optionally $T_A^{max}$ may be about 50° C. or less than $T_m$. In certain variations, the foaming agents may be activated at relatively high temperatures associated with compression molding, such as at temperatures ranging from greater than or equal to about 150° C. to less than or equal to about 450° C., optionally greater than or equal to about 150° C. to less than or equal to about 250° C., as dictated by the properties (e.g., $T_m$ or $T_c$) of the polymers in the polymeric material blanks to be molded. In certain variations, an initial activation temperature $(T_A^i)$ of the foaming agent is selected to be $T_A^i - 35°$ C. $\leq T \leq T_A^i + 50°$ C., where T is either $T_m$ or $T_c$, depending on whether the polymer is a thermoplastic or thermoset, respectively.

In certain aspects, the foaming agent is an endothermic foaming agent. Endothermic foaming agents have higher activation temperatures and tend to produce less foam. Further, the foam generated by endothermic foaming agents tends to be more controllable foam with more defined foam structures than foam structures created by exothermic foaming agents.

In certain variations, an endothermic foaming agent 130 may have an optimum gas yield temperature $(T_A^{max})$ at which decomposition and foaming are maximized of greater than or equal to about 175° C. to less than or equal to about 190° C., optionally greater than or equal to about 215° C. to less than or equal to about 230° C. The endothermic foaming agent 130 may have an initial activation temperature $(T_A^i)$ that is within about 35° C. of $T_A^{max}$ $(T_A^{max} - 35°$ C.). In certain variations, the endothermic foaming agent 130 may have an initial activation temperature $(T_A^i)$ at which decomposition and foaming begins of greater than or equal to about 140° C. to less than or equal to about 165° C., optionally greater than or equal to about 145° C. to less than or equal to about 155° C. In certain variations, the endothermic foaming agent 130 may have an optimum pressure range for generating gas and foam of greater than or equal to about 2 MPa to less than or equal to about 15 MPa, optionally greater than or equal to about 6 MPa and less than or equal to about 8 MPa, as discussed further below.

One suitable endothermic foaming agent is Foamazol® 61 sold by Bergen International. It has an activation temperature where decomposition $(T_A^i)$ starts at 145° C., with optimum gas yields occurring at temperatures $(T_A^{max})$ of about 175° C. to about 215° C. and optimum pressures of greater than or equal to about 8 MPa. Another suitable endothermic foaming agent is Foamazol® 70 sold by Bergen International. Foamazol® 70 has an activation temperature $(T_A^i)$ where decomposition starts at 150° C., with optimum gas yields occurring at temperatures $(T_A^{max})$ of about 190° C. to about 230° C. and optimum pressures of greater than or equal to about 8 MPa. Either Foamazol® 61 or Foamazol® 70 may come in a powdered or pellet form, where the polymer binder or resin used can be selected from an array of polymers, depending on the intended use.

The foaming agent 130 may be present at greater than or equal to about 0.1 volume % to less than or equal to about 2.5 volume % of the total polymer composite in the system (including the volume of polymer composite in the first blank 110 and the second blank 120). In certain variations, the foaming agent 130 may be present at greater than or equal to about 1 weight % to less than or equal to about 1.5 weight % of the total polymer composite in the system. For example, this amount of foaming agent (e.g., 1 to 1.5 weight %) is particularly suitable where the thermoplastic resin (e.g., a polyamide, such as a nylon).

After the foaming agent 130 is applied, the first surface 112 of the first blank 110 and the second surface 122 of the second blank 120 are brought into contact with the foaming agent 130 as shown in step 3, thus sandwiching the foaming agent 130 therebetween and forming an assembly 132. The assembly 132 thus includes the first blank 110 along a lower side, a central region with the foaming agent 130, and the second blank 120 on an upper side opposite to the lower side. The assembly 132 is further processed similarly to a traditional compression molding process.

In step 3, heat is applied to the assembly 132. The assembly 132 is thereby effectively preheated to a predetermined temperature $T_3$. The predetermined temperature $(T_3)$ in step 3 may be greater than or equal to the $T_m$ of the polymer composite (e.g., thermoplastic resin), while being less than or equal to about 50° C. above the optimum gas yield temperature $(T_A^{max})$ of the foaming agent, preferably equal to $T_A^{max}$ and greater than $T_A^i$ (initiation or activation temperature of the foaming agent) to prevent or limit premature foam formation prior to being introduced into the compression mold cavity. When pre-heating is employed, foaming action of the foaming agent may commence prior to insertion in the compression mold depending on the pre-heating temperatures. In such variation, step 3 may be accomplished in a heating unit such as an oven.

Alternatively, the assembly 132 may be heated within the compression mold cavity to a predetermined temperature under minimal or no pressure (e.g., less than 2 MPa). In certain aspects, the predetermined temperature is near or greater than the melting temperature ($T_m$) of the polymer(s) (e.g., for thermoplastic resins) or at about the curing temperature ($T_c$) of the polymer(s) (e.g., for thermoset resins) in the first blank 110 and the second blank 120. Thus, the assembly 132 to be molded may optionally be preheated (step 3), but is then positioned in a heated mold cavity that may be at the same temperature as that of the preheating stage or lower during compression molding (step 4).

When the assembly 132 is placed within a compression mold cavity (not shown in FIG. 2), pressure is also applied, as shown by the arrow in step 4. Alternatively, the assembly 132 may be heated and pressed simultaneously (step 3 and step 4 combined) by inserting 132 inside a heated mold cavity set at a predetermined temperature ($T_3=T_4$, where ($T_4$) corresponds to the temperature in step 4) that is near or greater than the melting temperature ($T_m$) of the polymer(s) (e.g., for thermoplastic resins) or equal to about the curing temperature ($T_c$) of the polymer(s) (e.g., thermoset resins) in the first blank 110 and the second blank 120. In certain aspects, the pressure applied during compression molding (step 4) may be less than or equal to about 15 MPa, for example, at greater than or equal to about 2 MPa to less than or equal to about 15 MPa, optionally greater than or equal to about 6 MPa to less than or equal to about 8 MPa.

The mold is closed and pressure and heat are applied in step 4. During the molding process, the assembly 132 conforms to the shape of the mold by the combined effect of the applied pressure and temperature. Typically, the mold is heated to a curing temperature of the polymer(s) present in the assembly (e.g., where the polymer is a thermoset) or to a temperature selected to be between the glass transition temperature ($T_g$) and the melting temperature ($T_m$) of the polymer(s) in the assembly (e.g., where the polymer is a thermoplastic and is preheated outside of the mold cavity), or alternatively to a temperature at or above the melting temperature ($T_m$) of the polymer(s) present in the assembly (e.g., the thermoplastic polymer is heated and pressed in the mold cavity simultaneously). Concurrently, the heat causes activation of the foaming agent, which creates a foam core structure that is constrained to the central region of the consolidated component or part due in part to the elevated viscosity of the polymer(s) of blanks 110 and 120 and to the high pressure used during compression molding. In certain aspects, if the mold temperature is set at $T_m$, it is cooled prior to demolding and removing the consolidated final product. In other aspects, if the mold temperature ($T_4$) is set such that $T_g \leq T_4 \leq T_m$ or $T_4 \approx T_c$, then the mold may be opened for demolding without further cooling.

A compression molded consolidated polymeric component 150 is thus formed as shown in step 5. The compression molded consolidated polymeric component 150 comprises a first consolidated polymeric layer 152, an intermediate or central foam layer 154, and a second consolidated polymeric layer 156. The first consolidated polymeric layer 152 is formed from the first blank 110. Application of temperature and pressure during compression molding can serve to react or cure the precursor material that forms a higher density polymeric material layer. The central foam layer 154 is formed in situ by the foaming agent reacting with portions of the polymer in the first blank 110 and the second blank 120. The foaming agent 130 may be activated during heating (or during a pre-heating step that continues during the molding process) and creates a foam core structure that is maintained in the central region of the consolidated component or part due to the high pressure used during compression molding. The second consolidated polymeric layer 156 is formed from the second blank 120 in the same manner as the first consolidated polymeric layer 152. It should be noted that the central foam layer 154 is integrated into the bulk of the compression molded consolidated polymeric component 150 and thus provides the ability to absorb and dampen impact energy delivered to the compression molded consolidated polymeric component 150.

Such a process improves the impact resistance of an otherwise brittle polymeric part with a minimum increase in thickness yet with neither weight increase nor modification to an overall design shape of the final part formed. The process allows a polymeric material, such as a fiber-reinforced composite, to have increased toughness without changing its chemistry or formulation and thus without changing its intrinsic and desirable properties, such as high strength and lightweight. Furthermore, such a compression molding process is highly versatile and can be used virtually with any part design and geometry.

Figure 3:
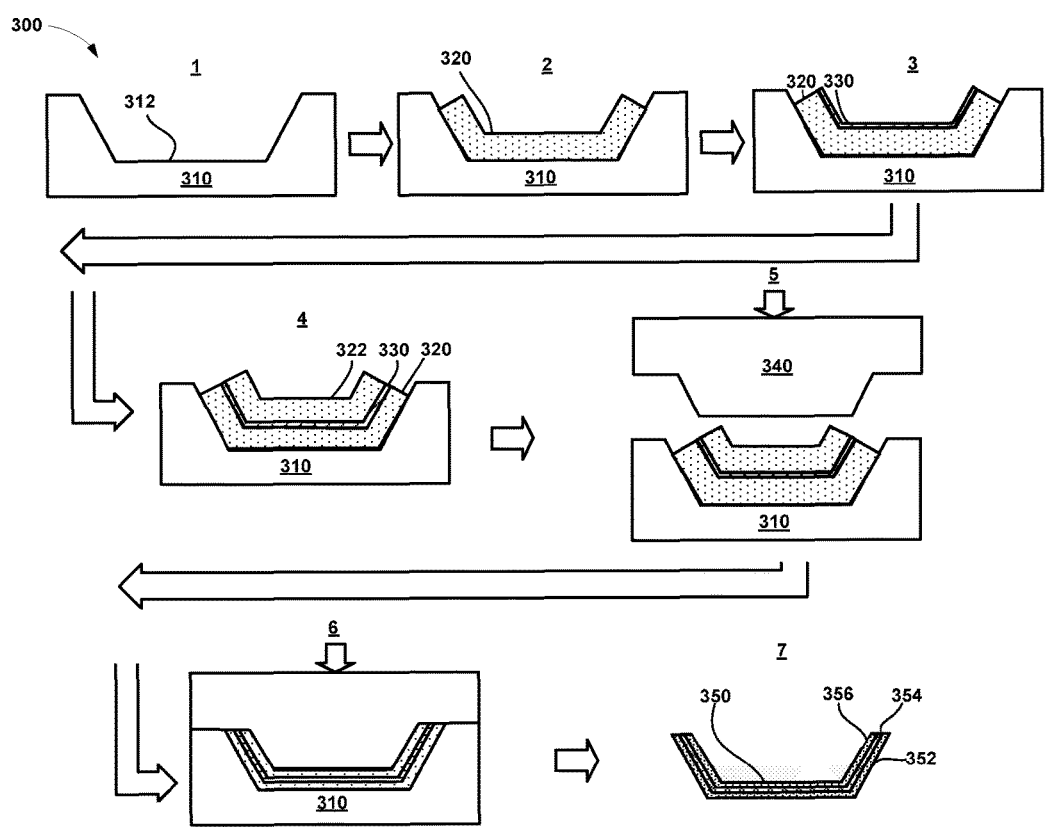
FIG. 3 shows a schematic of an exemplary compression molding process of two blanks made of polymeric material with a foaming agent introduced therebetween that form a consolidated component according to certain aspects of the present disclosure.

FIG. 3 shows a schematic of an exemplary simplified compression molding process 300 according to certain aspects of the present disclosure. Any of the materials and concepts described in the context of the process in FIG. 2 are also equally applicable to the process shown in FIG. 3, and unless otherwise indicated, and will not be repeated for the sake of brevity. A lower portion of a compression mold 310 defines a mold cavity 312 having a predetermined shape. As recognized by those of skill in the art, a variety of compression mold shapes may be used and the shape shown in FIG. 3 is merely exemplary and non-limiting. A first blank 320 comprising a polymeric material is disposed within the mold cavity 312 of lower mold portion 310 in step 2. The first blank 320 is optionally preheated to a predetermined temperature (e.g., where a thermoplastic), which may occur prior to disposing it into lower mold portion 310 or alternatively, by heating lower mold portion 310 and then in turn heating the first blank 320. In certain aspects, the predetermined temperature of the compression mold is near the melting temperature ($T_m$), or between the glass transition temperature ($T_g$) and the melting temperature ($T_m$), when the polymer(s) in the first blank 320 are thermoplastics. Alternatively, the predetermined temperature of the compression mold is at about the curing temperature ($T_c$) of the polymer(s) in the first blank 320 when the polymer(s) are thermosets. However, the predetermined temperature of the compression mold is also less than 50° C. above the optimum gas yield temperature ($T_A^{max}$–50° C.) of the chemical foaming agent 330, or preferably equal to about the optimum gas yield temperature ($T_A^{max}$) and greater than the initial activation temperature ($T_A^i$) of a chemical foaming agent 330.

In step 3, the chemical foaming agent 330 is contacted with or applied to the first blank 320, which may be preheated, as discussed above. Then, a second blank 322 comprising a polymeric material is disposed over the chemical foaming agent 330 and the first blank 320. The second blank 322 may also be preheated. In step 5, an upper portion of compression mold 340 is used to close the mold cavity 312 and apply pressure to the first blank 320, chemical foaming agent 330, and second blank 322. Although the upper mold portion 340 may be independently heated, it will preferably be heated at the same temperature as that of the lower mold cavity 310.

As pressure and temperature are applied to the first blank 320, chemical foaming agent 330, and second blank 322 in step 6, the materials flow and conform to the mold cavity 312 shape. Application of temperature and pressure during compression molding by upper mold portion 340 and lower mold portion 310 can compress and crystallize or cure the polymer precursor material to form a consolidated component that will retain the shape of the compression mold. Furthermore, application of temperature and pressure during the compression molding further facilitates gas generation by the foaming agent to create a thin layer of foam which is constrained to within the central region of the component due to the high molding pressure incurred in the process and the high viscosity of the polymer(s) in the blanks 320 and 322.

The upper mold portion 340 and the lower mold portion 310 may be cooled. The upper mold portion 340 is then raised and a compression molded consolidated polymeric component 350 is removed. The materials may be trimmed or finished. The compression molded consolidated polymeric component 350 includes a first consolidated polymeric layer 352 (formed from the first blank 320), an intermediate central foam layer 354 (formed in situ by the foaming agent 330 reacting with portions of the polymer in the first blank 320 and the second blank 322), and the second consolidated polymeric layer 356 (formed from the second blank 322). The central foam layer 354 is integrated into the bulk of the compression molded consolidated polymeric component 350, thus providing the ability to absorb and dampen impact energy delivered to the compression molded consolidated polymeric component 350 under load.

Thus, the compression molded consolidated polymeric component may exhibit a desirably high strain-to-failure property. In certain aspects, a representative compression molded consolidated polymeric component may have a strain-to-failure value of greater than or equal to about 1%, optionally greater than or equal to about 1.5%, and in certain variations, optionally greater than or equal to about 2%.

In certain aspects, compression molded consolidated polymeric components according to certain aspects of the present disclosure, especially compression molded consolidated fiber-reinforced composite materials comprising thermoplastic resin, may desirably have a Young's modulus (E) (e.g., a ratio of stress to strain (a/c) related to elasticity) of greater than or equal to about 10 GPa to less than or equal to about 30 GPa, and optionally greater than or equal to about 20 GPa to less than or equal to about 30 GPa.

The compression molded consolidated polymeric component with an integral intermediate foam layer has an improved impact resistance as compared to conventional designs, such as the compression molded consolidated polymeric component formed with the same polymeric materials, but lacking a foam layer (e.g., as described in the context of FIG. 1, for example). Impact resistance testing is a way of rating the resistance of a component to cracking or breakage when suddenly struck by an impact load. Various well-known standards specify the requirements for the impact testing. The most common testing methods include Charpy and Izod tests. They include the type and weight of the striker, also known as the Tup, the impact force, and the specimen support (either a v-block of a flat plate). There are three types of Tup strikers used for testing: Type A is a cone with a rounded point, Type B is a cylinder with a relatively flat surface, and Type C has a 0.5 inch diameter pin with a rounded or hemispherical end. The Tup striker is allowed to free fall and strike the specimen, but is typically connected to a cable that prevents it from bouncing or rebounding and striking the specimen again after the initial strike. The test specimen is then inspected for any signs of cracking or failure. In certain variations, the impact energy test used to determine such impact energy to first crack in accordance with certain aspects of the present disclosure is a Type C conducted with a 0.5 inch hemispherical tup striker, as is well known in the art.

For example, an impact testing machine may be a small drop tower that uses a fixed weight (approximately 7 kg) carriage (the tup is rigidly attached to the carriage). The height of the carriage is controlled immediately before dropping. Impact energy is calculated as IE=mgh where m is mass, h is drop height, and g is acceleration (gravitational constant). Drop testing may begin at a low height. The height is then gradually increased until a crack is visually apparent and observed. A second new sample is then used to test directly with the final height (where the crack occurred) to confirm the value.

In various aspects, the compression molded consolidated polymeric component with an integral central or intermediate foam layer is impact resistant. In certain variations, the compression molded consolidated polymeric component with an integral intermediate foam layer has an improved impact resistance as compared to a conventional compression molded consolidated polymeric component lacking the integral central foam layer that is improved by greater than or equal to about 20% (as measured by Joules of impact energy before cracking under the test conditions described above, with a 0.5 inch hemispherical tup striker and tested with a Dynatup carriage assembly of 7 kg), optionally greater than or equal to about 30% of impact energy before cracking, optionally greater than or equal to about 40%, optionally greater than or equal to about 50%, optionally greater than or equal to about 75%, optionally greater than or equal to about 100%, optionally greater than or equal to about 125%, optionally greater than or equal to about 150%, optionally greater than or equal to about 175%, optionally greater than or equal to about 200%, optionally greater than or equal to about 225%, optionally greater than or equal to about 250%, optionally greater than or equal to about 275%, and in certain aspects, optionally greater than or equal to about 300% improved impact resistance before cracking, by way of non-limiting example.

In certain aspects, the present disclosure provides a method of compression molding a polymeric component having improved impact resistance. The method optionally comprises applying a foaming agent to a first surface of a first blank comprising a first polymeric material. A second surface of a second blank comprising a second polymeric material is contacted with the foaming agent to form an assembly. The foaming agent is sandwiched between the first blank and the second blank in the assembly. Then, the assembly is disposed in a mold cavity of a compression mold. The assembly is compression molded by applying heat and pressure to form a compression molded consolidated polymeric component comprising a first polymeric layer, an intermediate foam layer, and a second polymeric layer.

In certain aspects, the first polymeric material of the first blank and the second polymeric material of the second blank comprise a thermoplastic resin. In such variations, the foaming agent may have an optimal gas yield temperature ($T_A^{max}$) and the thermoplastic resin has a maximum melting temperature ($T_m$). A relationship between the optimal gas yield temperature ($T_A^{max}$) of the foaming agent and the melting temperature ($T_m$) may be expressed by: $T_m-50°$ C.$\leq T_A^{max} < T_m+50°$ C. In other aspects, the heat applied during compression molding has a temperature ($T_{molding}$), so the relationships during the process may be expressed by: $T_m \leq T_{molding} < T_m+50°$ C. and $T_{molding} \leq T_A^{max}$.

In certain variations, the polymeric material of the first blank and the polymeric material of the second blank are both reinforced composites each comprising a polymer and a reinforcement material. As discussed above, the reinforcement material comprises a plurality of fibers, whiskers, platelets, particles, or combinations thereof. For example, the reinforcement material comprises a plurality of carbon fibers, glass fibers, carbon black particles, (nano-)clay platelets, and combinations thereof.

In certain other aspects, the method may further comprise preheating the first blank and the second blank prior to the applying of the foaming agent. The first blank and the second blank may also be preheated after applying the foaming agent and sandwiching the foaming agent between the blanks, but prior to introducing the assembly into the compression molding device. Such preheating is particularly desirable when using a thermoplastic resin in the blanks. Notably, the applying of the heat may include maintaining the heat (from the preheating process) within the compression mold.

In other aspects, the first polymeric material of the first blank and the second polymeric material of the second blank may comprise a thermoset resin. In such variations, the foaming agent may have an optimal gas yield temperature ($T_A^{max}$) and the thermoset resin has a curing temperature ($T_c$) at which reaction (curing, crosslinking, etc.) occurs. A relationship between the optimal gas yield temperature ($T_A^{max}$) of the foaming agent and the curing temperature ($T_c$) may be expressed by: $T_c-50°$ C.$\leq T_A^{max} < T_c+50°$ C. In other aspects, the heat applied during compression molding has a temperature ($T_{molding}$), so the relationships during the process may be expressed by: $T_c-10°$ C.$\leq T_{molding} < T_c+10°$ C. and $T_{molding} \leq T_A^{max}$.

The compression molded consolidated polymeric component formed by such a process may have a Young's modulus (E) of greater than or equal to about 10 GPa to less than or equal to about 30 GPa. In other aspects, the pressure applied during compression molding is greater than or equal to about 6 MPa and less than or equal to about 15 MPa.

In yet other aspects, the present disclosure contemplates a method of compression molding a polymeric component having improved impact resistance. The method may comprise applying a foaming agent to a first surface of a first preheated blank comprising a first polymeric material. Then a second surface of a second preheated blank comprising a second polymeric material is contacted with the foaming agent to form an assembly. The foaming agent is sandwiched between the first preheated blank and the second preheated blank in the assembly. Then, the assembly is disposed in a mold cavity of a compression mold. Next, the assembly is compression molded by applying heat and pressure to form a compression molded consolidated polymeric component comprising a first polymeric layer, an intermediate foam layer, and a second polymeric layer.

In certain variations, the first polymeric material of the first blank and the second polymeric material of the second blank comprise a thermoplastic resin. In such variations, the foaming agent may have an optimal gas yield temperature ($T_A^{max}$) and the thermoplastic resin has a maximum melting temperature ($T_m$). A relationship between the optimal gas yield temperature ($T_A^{max}$) of the foaming agent and the melting temperature ($T_m$) may be expressed by: $T_m-50°$ C.$\leq T_A^{max} < T_m+50°$ C. In other aspects, the method may further comprise preheating the first preheated blank to a first temperature ($T_{preheat}$), where the foaming agent has an optimal gas yield temperature ($T_A^{max}$), the thermoplastic resin has a maximum melting temperature ($T_m$) and a glass transition temperature ($T_g$), and the heat applied during compression molding has a second temperature ($T_{molding}$). During such a process, the following relationships apply to conditions: $T_m < T_{preheat} < T_m+50°$ C. with $T_A^{max} \leq T_{preheat}$ and where $T_g \leq T_{molding} < T_m$. The first polymeric material of the first blank and the second polymeric material of the second blank may both be reinforced composites each comprising a polymer and a reinforcement material.

The method may also further comprise preheating the first blank to a temperature that is greater than or equal to about a melting temperature of the first polymeric material prior to applying the foaming agent. Alternatively, the second blank may be preheated to a temperature that is greater than or equal to about a melting temperature of the second polymeric material prior to contacting the second surface of the second preheated blank with the foaming agent. Alternatively, both the first blank is preheated to a temperature that is greater than or equal to a melting temperature of the first polymeric material prior to applying the foaming agent and the second blank is also preheated to a temperature that is greater than or equal to about a melting temperature of the second polymeric material prior to contacting the second surface of the second preheated blank with the foaming agent.

The compression molded consolidated polymeric component formed by such a process may have a Young's modulus (E) of greater than or equal to about 10 GPa to less than or equal to about 30 GPa. In other aspects, the pressure applied during compression molding is greater than or equal to about 6 MPa and less than or equal to about 15 MPa.

In yet other aspects, methods of compression molding a polymeric structural component having improved impact resistance are contemplated. The method may comprise applying a foaming agent to a first surface of a first blank comprising a first polymer composite material. A second surface of a second blank comprising a second polymer composite material is then contacted with the foaming agent to form an assembly, wherein the foaming agent is sandwiched between the first blank and the second blank in the assembly. The assembly is disposed in a mold cavity of a compression mold. Finally, the assembly is compression molded by applying heat and pressure to form a compression molded consolidated polymeric structural component comprising a first composite layer, an intermediate foam layer, and a second composite layer. In certain aspects, the structural component is for a vehicle and the compression molded consolidated polymeric structural component is selected from the group consisting of: a hood, an underbody shield, a structural panel, an interior floor, a floor pan, a roof, an exterior surface, a fender, a scoop, a spoiler, a storage area, a glove box, a console box, a gas tank protection shield, a trunk, a trunk floor, a truck bed, and combinations thereof.

Thus, in accordance with certain aspects of the present disclosure, a process is contemplated that allows manufacturing of polymeric component, such as fiber-reinforced thermoplastic composites, having high impact resistance that do not require a lamination process with added materials. The consolidated compression molded polymeric components formed by the present methods can sustain high impact load without any visible cracking. Another benefit of use of the intermediate foam layer in the core region is that a counter-pressure effect can serve to improve part surface finish with sink mark reduction. Thus, no additional materials (aside from using a foaming agent) are necessary to improve impact resistance while retaining strength of a polymeric component. The methods of the present disclosure do not require any additional or extensive assembly steps that may be required for other reinforcement approaches or techniques. Additionally, no change is required for tool design of a part processed in accordance with the present disclosure as compared to a conventional compression molding process. The processes according to the present disclosure can be used with virtually with any part design and geometry. Furthermore, the process not only provides a robust component that is tough and resistant to impact, but further does not add weight to the final part. Thus, the final consolidated compression molded polymeric component retains the desirable light-weight properties. Such components are particularly useful in structural automotive applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of compression molding a polymeric component having improved impact resistance, the method comprising:
    applying a foaming agent to a first surface of a first blank comprising a first polymeric material;
    contacting a second surface of a second blank comprising a second polymeric material with the foaming agent to form an assembly, wherein the foaming agent is sandwiched between the first blank and the second blank in the assembly;
    disposing the assembly in a mold cavity of a compression mold; and
    compression molding the assembly by applying heat and pressure to form a compression molded consolidated polymeric component comprising a first polymeric layer, an intermediate foam layer, and a second polymeric layer,
    wherein the first polymeric material of the first blank and the second polymeric material of the second blank comprise a thermoplastic resin, and the foaming agent has an optimal gas yield temperature ($T_A^{max}$) and the thermoplastic resin has a maximum melting temperature ($T_m$) having a relationship of $T_m-50°$ C.$\leq T_A^{max}<T_m+50°$ C.

2. The method of claim 1, wherein the first polymeric material of the first blank and the second polymeric material of the second blank are both reinforced composites each comprising a polymer and a reinforcement material.

3. The method of claim 2, wherein the reinforcement material is selected from the group consisting of: a plurality of fibers, whiskers, platelets, particles, and combinations thereof.

4. The method of claim 1, wherein the heat applied during compression molding has a temperature ($T_{molding}$), having the following relationships: $T_m \leq T_{molding} < T_m+50°$ C. and $T_{molding} \leq T_A^{max}$.

5. The method of claim 1, further comprising preheating the first blank and the second blank prior to or during the applying of the foaming agent.

6. The method of claim 1, wherein the compression molded consolidated polymeric component has a Young's modulus (E) of greater than or equal to about 10 GPa to less than or equal to about 30 GPa.

7. The method of claim 1, wherein the pressure applied during compression molding is greater than or equal to about 6 MPa and less than or equal to about 15 MPa.

8. A method of compression molding a polymeric component having improved impact resistance, the method comprising:
    applying a foaming agent to a first surface of a first preheated blank comprising a first polymeric material;
    contacting a second surface of a second preheated blank comprising a second polymeric material with the foaming agent to form an assembly, wherein the foaming agent is sandwiched between the first preheated blank and the second preheated blank in the assembly;
    disposing the assembly in a mold cavity of a compression mold; and
    compression molding the assembly by applying heat and pressure to form a compression molded consolidated polymeric component comprising a first polymeric layer, an intermediate foam layer, and a second polymeric layer, wherein the pressure applied during compression molding is greater than or equal to about 6 MPa and less than or equal to about 15 MPa.

9. The method of claim 8, wherein the first polymeric material of the first blank and the second polymeric material of the second blank comprise a thermoplastic resin.

10. The method of claim 9, wherein the foaming agent has an optimal gas yield temperature ($T_A^{max}$) and the thermoplastic resin has a maximum melting temperature ($T_m$) having a relationship of $T_m-50°$ C.$\leq T_A^{max}<T_m+50°$ C.

11. The method of claim 9, further comprising preheating the first preheated blank to a first temperature ($T_{preheat}$), wherein the foaming agent has an optimal gas yield temperature ($T_A^{max}$), the thermoplastic resin has a maximum melting temperature ($T_m$) and a glass transition temperature ($T_g$), and the heat applied during compression molding has a second temperature ($T_{molding}$) having the following relationships: $T_m<T_{preheat}<T_m+50°$ C. with $T_A^{max} \leq T_{preheat}$ and where $T_g \leq T_{molding}<T_m$.

12. The method of claim 8, wherein the first polymeric material of the first preheated blank and the second polymeric material of the second preheated blank are both reinforced composites each comprising a polymer and a reinforcement material.

13. The method of claim 8, wherein the compression molded consolidated polymeric component has a Young's modulus (E) of greater than or equal to about 10 GPa to less than or equal to about 30 GPa.

14. The method of claim 8, further comprising preheating the first preheated blank to a temperature that is greater than or equal to about a melting temperature ($T_m$) of the first polymeric material prior to applying the foaming agent, or preheating the second preheated blank to a temperature that is greater than or equal to about a melting temperature ($T_m$) of the second polymeric material prior to contacting the second surface of the second preheated blank with the foaming agent, or preheating the first preheated blank to a temperature that is greater than or equal to about a melting temperature ($T_m$) of the first polymeric material prior to applying the foaming agent and preheating the second preheated blank to a temperature that is greater than or equal to about a melting temperature ($T_m$) of the second polymeric material prior to contacting the second surface of the second preheated blank with the foaming agent.

15. A method of compression molding a polymeric structural component having improved impact resistance, the method comprising:

applying a foaming agent to a first surface of a first blank comprising a first polymer composite material;

contacting a second surface of a second blank comprising a second polymer composite material with the foaming agent to form an assembly, wherein the foaming agent is sandwiched between the first blank and the second blank in the assembly;

disposing the assembly in a mold cavity of a compression mold; and compression molding the assembly by applying heat and pressure to form a compression molded consolidated polymeric structural component comprising a first composite layer, an intermediate foam layer, and a second composite layer, wherein the compression molded consolidated polymeric structural component has a Young's modulus (E) of greater than or equal to about 10 GPa to less than or equal to about 30 GPa.

16. The method of claim 15, wherein the polymeric structural component is for a vehicle and the compression molded consolidated polymeric structural component is selected from the group consisting of: a hood, an underbody shield, a structural panel, an interior floor, a floor pan, a roof, an exterior surface, a fender, a scoop, a spoiler, a storage area, a glove box, a console box, a gas tank protection shield, a trunk, a trunk floor, a truck bed, and combinations thereof.

17. The method of claim 15, wherein the pressure applied during compression molding is greater than or equal to about 6 MPa and less than or equal to about 15 MPa.

18. The method of claim 8, wherein the first polymeric material and the second polymeric material comprise a thermoset resin and the foaming agent has an optimal gas yield temperature ($T_A^{max}$), the thermoset resin has a curing temperature ($T_c$), and the heat applied during compression molding has a temperature ($T_{molding}$), having the following relationships: $T_c - 10° C. \leq T_{molding} < T_c + 10° C.$ and $T_{molding} \leq T_A^{max}$.

19. The method of claim 18, further having the relationship of $T_c - 50° C. \leq T_A^{max} < T_c + 50° C.$

* * * * *